US012397579B2

(12) United States Patent
Yamada et al.

(10) Patent No.: US 12,397,579 B2
(45) Date of Patent: Aug. 26, 2025

(54) WRITING INSTRUMENT

(71) Applicant: MITSUBISHI PENCIL COMPANY, LIMITED, Tokyo (JP)

(72) Inventors: Masaya Yamada, Tokyo (JP); Akari Shinohara, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/724,727

(22) PCT Filed: Jan. 13, 2023

(86) PCT No.: PCT/JP2023/000835
§ 371 (c)(1),
(2) Date: Jun. 27, 2024

(87) PCT Pub. No.: WO2023/145493
PCT Pub. Date: Aug. 3, 2023

(65) Prior Publication Data
US 2025/0065665 A1    Feb. 27, 2025

(30) Foreign Application Priority Data
Jan. 28, 2022    (JP) ................. 2022-012245

(51) Int. Cl.
*B43K 23/008* (2006.01)
*B43K 7/00* (2006.01)
*B43K 7/12* (2006.01)
*B43K 24/08* (2006.01)
*B43K 25/02* (2006.01)

(52) U.S. Cl.
CPC ............ *B43K 23/008* (2013.01); *B43K 7/005* (2013.01); *B43K 7/12* (2013.01); *B43K 24/08* (2013.01); *B43K 25/02* (2013.01); *B43K 25/024* (2013.01)

(58) Field of Classification Search
CPC ........ B43K 23/008; B43K 7/005; B43K 7/12; B43K 24/08; B43K 25/02; B43K 25/024; B43K 23/00; B43K 25/022
USPC ............................................. 401/6, 104, 131
See application file for complete search history.

(56) References Cited

U.S. PATENT DOCUMENTS 7,794,164 B2 *  9/2010  Kobayashi ........... B43K 23/008
                                                            401/292
2024/0217261 A1 *  7/2024  Nakadai ................. B43K 7/005

FOREIGN PATENT DOCUMENTS

| JP | 2005-111754 A | 4/2005 |
| JP | 2016-20074 A | 2/2016 |
| JP | 2017-105186 A | 6/2017 |
| WO | WO 2020/050247 A1 | 3/2020 |

OTHER PUBLICATIONS

International Search Report Issued Mar. 20, 2023 in PCT/JP2023/000835, filed Jan. 13, 2023, 2 pages.

* cited by examiner

*Primary Examiner* — David J Walczak
(74) *Attorney, Agent, or Firm* — Oblon, McClelland, Maier & Neustadt, L.L.P.

(57) ABSTRACT

A writing instrument includes a shaft barrel and a grip provided at part of the shaft barrel. The grip has a cylindrically shaped inside shaft part and a cylindrically shaped outside shaft part arranged at the outside of the inside shaft part, thinner than the inside shaft part, and made of a nonviscoelastic plastic. A space part is provided between the inside shaft part and the outside shaft part.

10 Claims, 6 Drawing Sheets

(A)

(B)

WRITING INSTRUMENT

FIELD

The present invention relates to a writing instrument.

BACKGROUND

Known in the art is a writing instrument which has a grip having viscoelasticity at the part which the user holds by the fingers at the time of writing. This prevents slip at the time of writing and improves the holding feel such as the fit and other feel due to the viscoelasticity (PTL 1). In the writing instrument described in PTL 1, the grip is formed by two-color molding which first forms a shaft barrel, then secondly forms a styrene-based elastomer or other plastic having viscoelasticity on it in a cylindrical shape.

CITATIONS LIST

Patent Literature

[PTL 1] Japanese Unexamined Patent Publication No. 2005-111754

SUMMARY

Technical Problem

If forming a grip by a styrene-based elastomer having a high viscoelasticity etc., due to the absorption of sweat from the user, aging, etc., the material of the grip will change and the fit will worsen or stickiness will occur thereby possibly detracting from the holding feel.

The present invention has as its object to provide a writing instrument provided with a grip enabling realization of stable prevention of slip and maintenance of the holding feel regardless of aging, etc.

Solution to Problem

According to one aspect of the present invention, there is provided a writing instrument comprising a shaft barrel and a grip provided at part of the shaft barrel, wherein the grip has a cylindrically shaped inside shaft part and a cylindrically shaped outside shaft part arranged at the outside of the inside shaft part, thinner than the inside shaft part, and comprised of a nonviscoelastic plastic and a space part is provided between the inside shaft part and the outside shaft part.

The space part may be a single cylindrical space. The grip may further have a first connecting part at which an outside surface of an end of the inside shaft part and an inside surface of the outside shaft part are connected and a second connecting part at which an inside surface of an end of the outside shaft part and an outside surface of the inside shaft part are connected, a space part being defined between the first connecting part and the second connecting part. The connection at the first connecting part or the second connecting part may also be a screw connection. The inside shaft part and the outside shaft part may be formed by the same materials. The shaft barrel may have a front shaft and a rear shaft, the front shaft may have the outside shaft part, and the rear shaft may have the inside shaft part. The writing instrument may be a click-type writing instrument provided with a writing member arranged inside the shaft barrel and a spring biasing the writing member to the rear, and a front end of the spring may be held by the front shaft.

Further, the writing instrument may further comprise a clip member, the clip member having an outside clip part extending along an axial direction of the shaft barrel and separated from a side surface of the shaft barrel and an inside clip part extending along the axial direction between the shaft barrel and the outside clip part, and may be configured so that just the inside clip part elastically deforms and can clamp on to an object without the outside clip part deforming and so that the elastic deformation of the inside clip part is restricted by the inside surface of the outside clip part.

The inside clip part may have a curved part curving toward a center axial direction of the shaft barrel, and an object can be clamped on to by the curved part. The inside clip part may have a projection shaped abutting part, and the abutting part may approach or abut against the side surface of the shaft barrel. The outside clip part may be provided with a recessed part, and the inside clip part may be arranged inside the recessed part. The shaft barrel may have an inside barrel mating with a rear end part of the shaft barrel, the outside clip part may be provided at the rear end part of the shaft barrel, the inside clip part may be provided at the inside barrel, the writing instrument may be a click-type writing instrument, and the inside barrel may configure a click mechanism.

Advantageous Effects of Invention

According to an aspect of the present invention, the common effect is exhibited of provision of a writing instrument provided with a grip enabling realization of stable prevention of slip and maintenance of the holding feel regardless of aging, etc.

DESCRIPTION OF EMBODIMENTS

Figure 1:
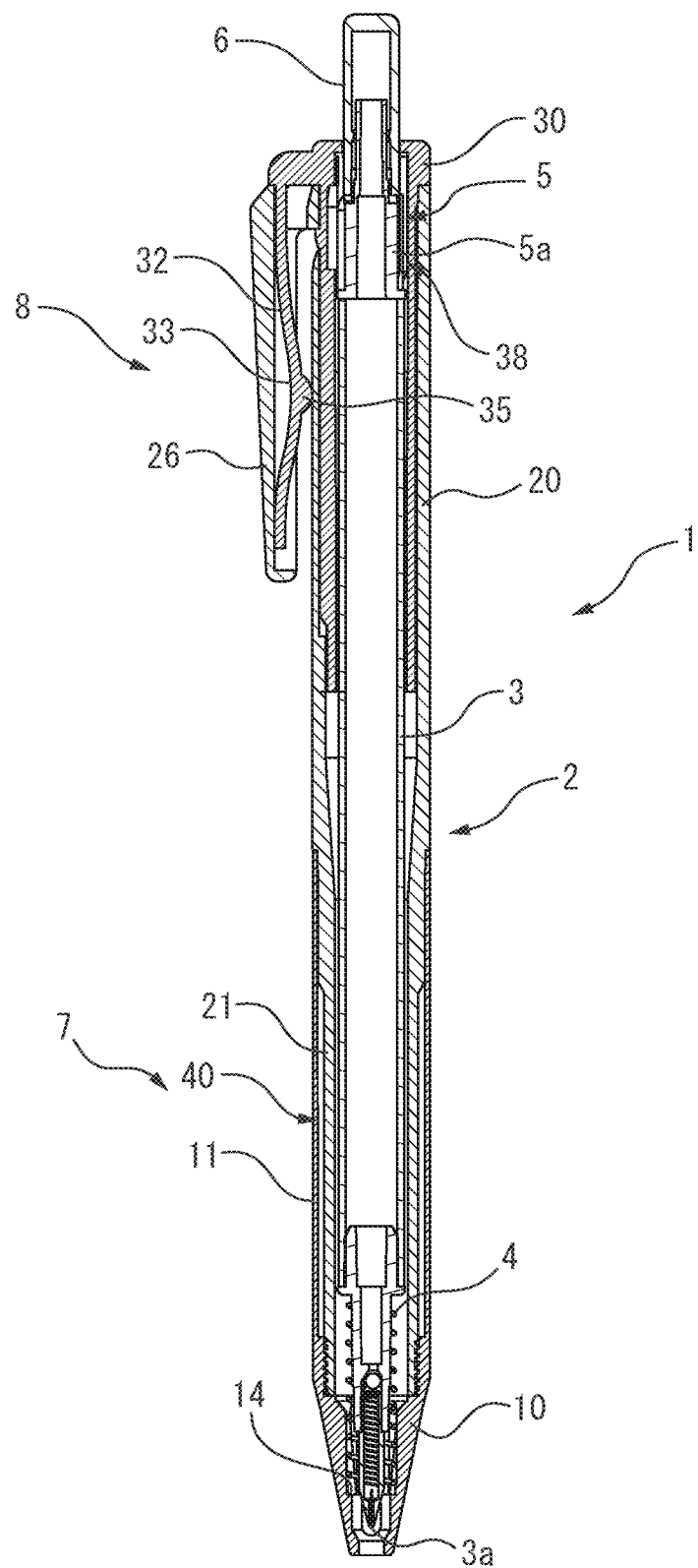
FIG. 1 is a vertical cross-sectional view of a writing instrument according to an embodiment of the present invention.

Below, referring to the drawings, an embodiment of the present invention will be explained in detail. Throughout the drawings, corresponding components are assigned common reference notations.

FIG. 1 is a vertical cross-sectional view of a writing instrument 1 according to an embodiment of the present invention. In the present embodiment, the writing instrument 1 is a click-type writing instrument.

The writing instrument 1 has a front shaft 10, rear shaft 20, and inside barrel 30. The front shaft 10 and rear shaft 20 configure a shaft barrel 2. Note that, the inside barrel 30 may also be included in references to the "shaft barrel 2". Inside of the shaft barrel 2 is arranged a refill 3 comprised of a writing member provided with a writing part 3a at one end. In this Description, in the axial direction of the writing instrument 1, the writing part 3a side will be defined as the "front" side and the side opposite to the writing part 3a will be defined as the "rear" side.

The refill 3 is specifically a ballpoint pen refill. The refill 3 is biased to the rear by a spring 4. To the rear of the refill 3, a rotor 5 is arranged. The rotor 5 is biased to the rear together with the refill 3 by the spring 4. To the rear of the rotor 5, an operating member 6 is arranged. The operating member 6 projects out from the rear end of the shaft barrel 2, specifically the rear end of the inside barrel 30. The writing instrument 1 further has a grip 7 and a clip member 8. The grip 7 is provided at part of the outside surface of the shaft barrel 2 as the part which the user holds by the fingers at the time of writing. The clip member 8 is provided at the rear end of the shaft barrel 2 and configured to clamp on to an object.

Figure 6:
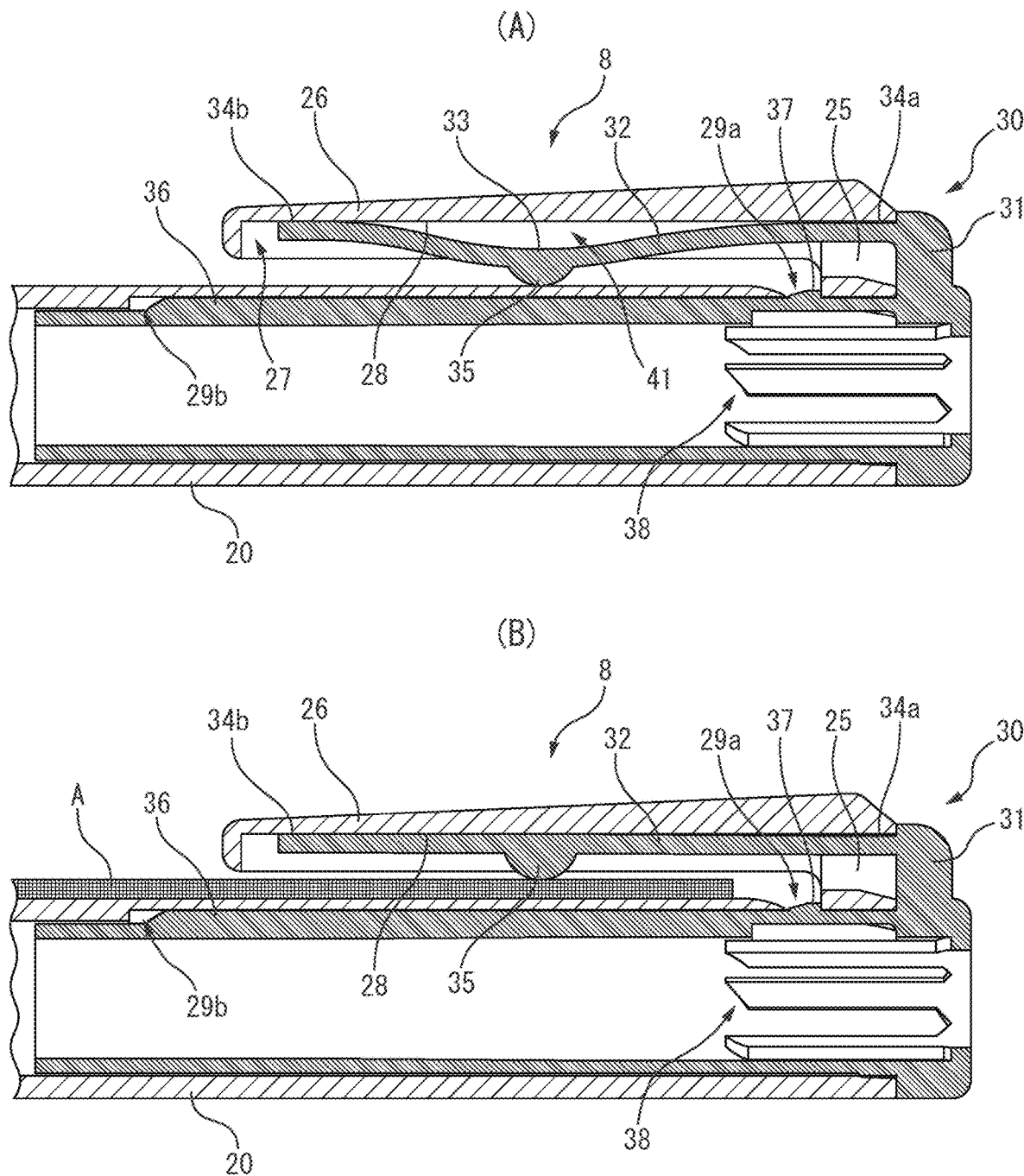
FIG. 6 is a vertical cross-sectional view showing clamping on to an object by a clip member.

At the inside surface of the rear end of the inside barrel 30, a projection shaped outside cam 38 is formed (FIG. 6). The rotor 5, operating member 6, and outside cam 38 configure a known click mechanism. At the writing instrument 1, it is possible to switch between a writing state where the writing part 3a projects out from the front end of the shaft barrel 2 and the nonwriting state where the writing part 3a is retracted inside the shaft barrel 2 by a click operation. Specifically, the click operation is performed by pushing the operating member 6 to the front against the biasing force of the spring 4 to make the rotor 5 move to a predetermined position.

To change the writing instrument 1 from the nonwriting state to the writing state, the click operation is used to push the operating member 6 toward the front and make the rotor 5 move to the front together with the operating member 6. If releasing the force applied to the operating member 6 after making the rotor 5 move to the above-mentioned predetermined position, the rotor 5 is retracted by the biasing force of the spring 4. The rotor 5 retracts while cooperating with the outside cam 38 to rotate, and the rear end face of the cam part 5a formed at the outer circumferential surface of the rotor 5 and the front end face of the outside cam 38 engage. At this time, the writing part 3a of the refill 3 projects out from the front end of the shaft barrel 2 and the writing instrument 1 maintains the writing state.

To change the writing instrument 1 from the writing state to the nonwriting state, a click operation is used to push the operating member 6 toward the front and make the rotor 5 move to the front together with the operating member 6 again. By releasing the force applied to the operating member 6 after making the rotor 5 move to the predetermined position, the rotor 5 is retracted by the biasing force of the spring 4. The rotor 5 retracts while cooperating with the outside cam 38 to rotate whereby the rear end face of the cam part 5a of the rotor 5 and the front end face of the outside cam 38 disengage. As a result, the refill 3 moves to the rear together with the rotor 5 by biasing force of the spring 4, and the writing part 3a retracts inside the shaft barrel 2 whereby the writing instrument 1 again becomes the nonwriting state.

Figure 2:
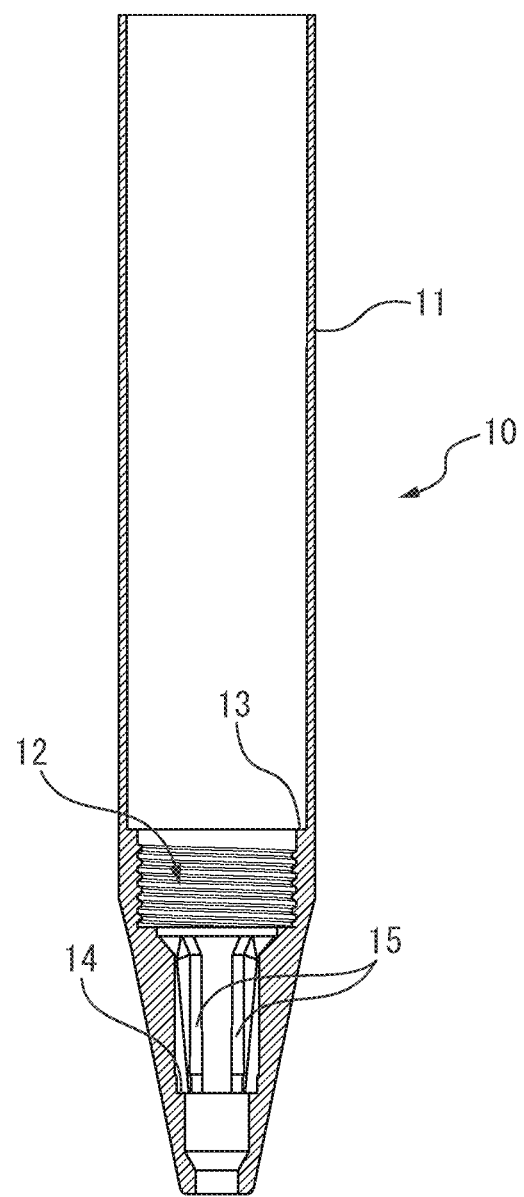
FIG. 2 is a vertical cross-sectional view of a front shaft.

FIG. 2 is a vertical cross-sectional view of the front shaft 10. The front shaft 10 has a cylindrically shaped outside shaft part 11 constituting the majority of the instrument in the axial direction. At the inside of the front shaft 10, a female screw part 12 arranged in the front of the outside shaft part 11 and of an inside diameter smaller than the inside diameter of the outside shaft part 11, a step part 13 facing the rear between the outside shaft part 11 and the female screw part 12, and a supporting surface 14 arranged in the front of the female screw part 12 and facing to the rear are formed. At the inside surface of the front shaft 10 between the female screw part 12 and supporting surface 14, a plurality of holding projections 15 extending in the axial direction are formed at equal intervals along the circumferential direction.

Referring to FIG. 1 and FIG. 2, the front end part of the spring 4 is supported by the supporting surface 14 and is restricted in movement to the front. Further, the spring 4 is restricted in movement in the diametrical direction by being surrounded by the plurality of holding projections 15 and suppressed in bending etc. As a result, the spring 4 can stably bias the refill 3 to the rear.

Figure 3:
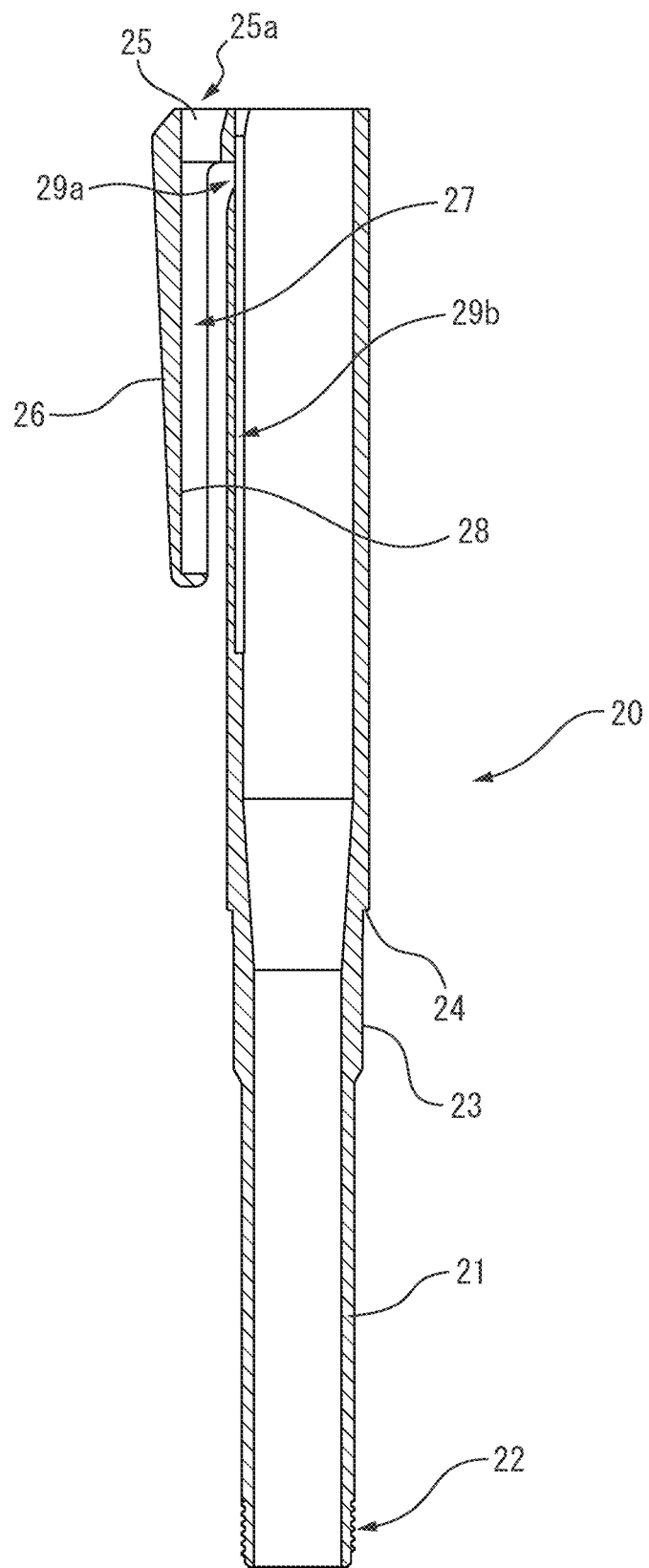
FIG. 3 is a vertical cross-sectional view of a rear shaft.

FIG. 3 is a vertical cross-sectional view of the rear shaft 20. The rear shaft 20 has a cylindrically shaped inside shaft part 21, a male screw part 22 provided at the outside surface of the front end part of the inside shaft part 21, and a larger diameter mating part 23 provided at the outside surface at the rear of the inside shaft part 21. At the outside surface at the rear of the mating part 23, a ring-shaped engaging surface 24 facing forward is formed. At the outside surface of the rear end part of the rear shaft 20, an outside clip part 26 is formed through a first connecting part 25. At the first connecting part 25, an insertion hole 25a extending in the axial direction is formed. The outside clip part 26 extends to the front along the axial direction of the rear shaft 20, in turn the shaft barrel 2, and is separated from the side surface of the rear shaft 20. At the inside of the outside clip part 26, that is, the inside at the center axis side of the rear shaft 20, a recessed part 27 extending in the axial direction is formed. Inside the recessed part 27, a restricting surface 28 including a surface corresponding to the bottom surface is provided. At the side surface of the rear shaft 20 in the front from the first connecting part 25, a mating hole 29a is formed. At the inside surface of the rear shaft 20 substantially corresponding to the outside clip part 26, a groove part 29b extending to the front from the rear end part is formed.

Figure 4:
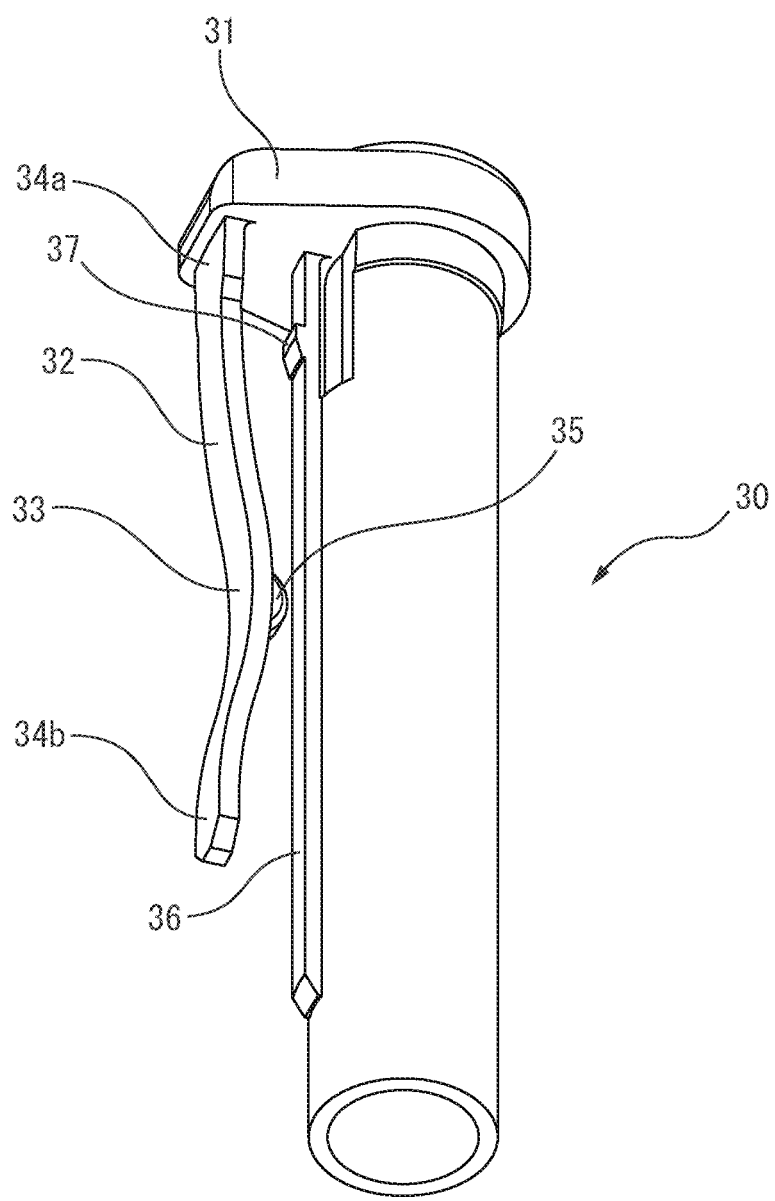
FIG. 4 is a perspective view of an inside barrel.

FIG. 4 is a perspective view of an inside barrel 30. At the outside surface of the rear end part of the inside barrel 30, an inside clip part 32 is formed through a second connecting part 31. The inside clip part 32 extends to the front along the axial direction of the inside barrel 30, in turn the shaft barrel 2, and separates from the side surface of the inside barrel 30. Further, the inside clip part 32 has a curved part 33 curved toward a center axial direction of the inside barrel 30. That is, at the inside clip part 32, the base part 34a of the connecting part with the second connecting part 31 and the front end part 34b of the front end of the inside clip part 32 are substantially equally separated from the side surface of the inside barrel 30. A curved part 33 is preferably provided at a center part in the axial direction. The inside of the inside clip part 32, that is, the inside at the center axis side of the inside barrel 30, in particular the inside of the curved part 33, is formed with an abutting part 35 comprised of a projection shaped ball part. The outside surface of the inside barrel 30 substantially corresponding to the inside clip part 32 is formed with a vertical projection 36 extending to the front from the second connecting part 31. On the vertical projection 36 in front of the second connecting part 31, a mating projection 37 is formed.

Figure 5:
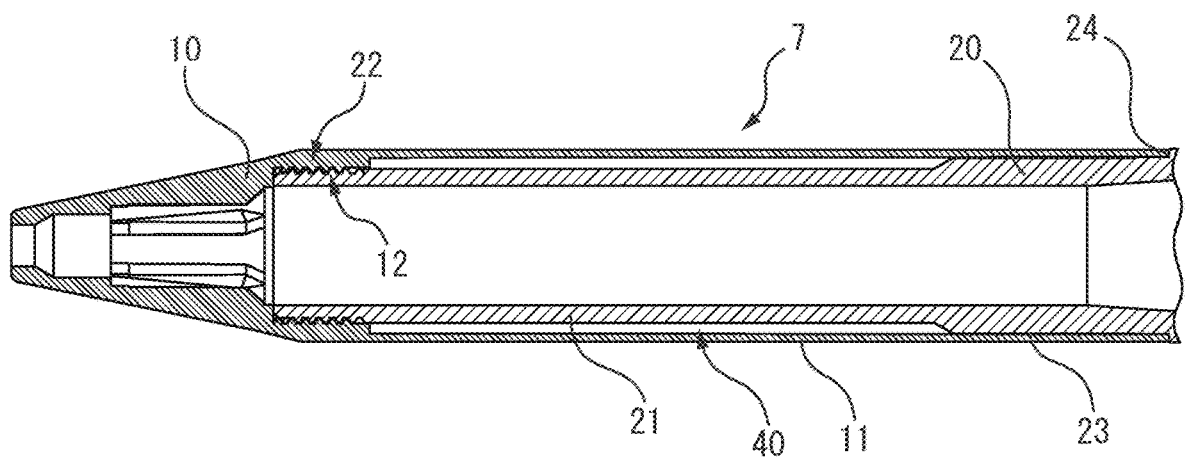
FIG. 5 is a vertical cross-sectional view showing deformation of a grip.
Figure 5:
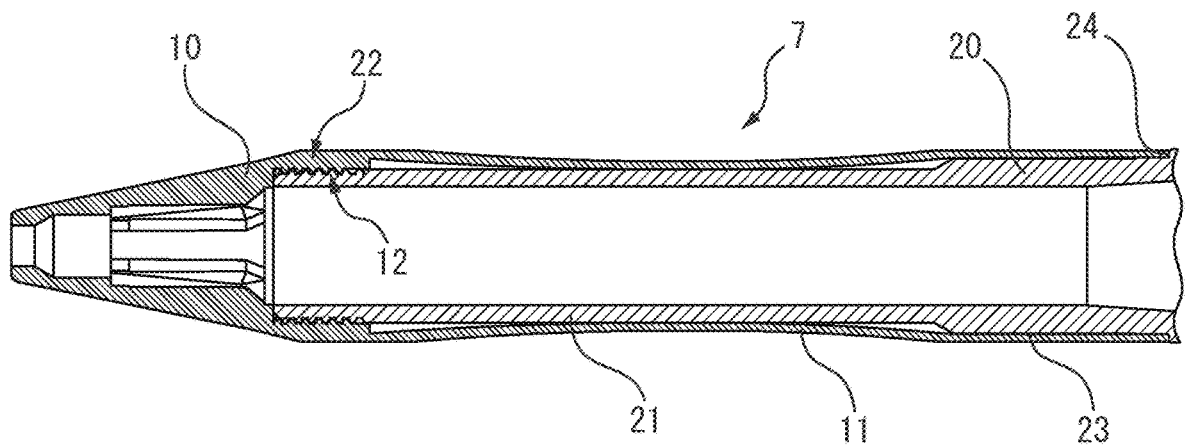

FIG. 5 is a vertical cross-sectional view showing deformation of the grip 7. Specifically, FIG. 5(A) shows the grip 7 before deformation, while FIG. 5(B) shows the grip 7 after deformation. First, referring to FIG. 1 and FIG. 5(A), the assembly operation of the shaft barrel 2, that is, the assembly operation of the front shaft 10 and rear shaft 20, will be explained. The shaft barrel 2 is assembled by the inside shaft part 21 and mating part 23 of the rear shaft 20 being inserted to the inside of the front shaft 10 and by the male screw part 22 of the rear shaft 20 being screwed into the female screw part 12 of the front shaft 10. Further, when the female screw part 12 and male screw part 22 finish being screwed together, the rear end part of the front shaft 10 abuts against and engages with the engaging face 24 of the rear shaft 20. At this time, the rear part of the front shaft 10 is strongly mated with the mating part 23 of the rear shaft 20 by press fitting or gently mated. As a result, between the inside shaft part 21 and the outside shaft part 11 arranged at the outside of the inside shaft part 21, a closed first space part 40 is provided. The first space part 40 is a single cylindrical space.

The outside shaft part 11, that is, the front shaft 10, is formed from a nonviscoelastic plastic, for example, polypropylene. Here, "nonviscoelastic plastic" means not rubber or an elastomer. As shown in FIG. 5, the outside shaft part 11 is formed thinner than the inside shaft part 21.

If the user holds the grip 7 by the fingers from the state shown in FIG. 5(A) at the time of writing, a force acts on the grip 7 in the diametrical direction by the pressing force by its being held and, as shown in FIG. 5(B), only the outside shaft part 11 elastically deforms in the diametrical direction. That is, the part of the outside shaft part 11 pressed by the fingers elastically deforms inward in the diametrical direction while the part of the outside shaft part 11 not pressed by the fingers elastically deforms outward in the diametrical direction corresponding to the elastic deformation inward in the diametrical direction. The inside shaft part 21 is thicker than the outside shaft part 11 so is high in rigidity and does not elastically deform. Deformation inward in the diametrical direction of the outside shaft part 11 is restricted by the inside surface of the outside shaft part 11 abutting against the outside surface of the inside shaft part 21. Such deformation of the outside shaft part 11 becomes possible due to the presence of the first space part 40 serving as free clearance between the outside shaft part 11 and inside shaft part 21.

As a result of the outside shaft part 11 elastically deforming, the outside shaft part 11 deforms in accordance with the position of the fingers even if the outside shaft part 11 is formed by a nonviscoelastic plastic and a good fit or other good holding feel can be obtained. Further, the outside shaft part 11 deforms so as to curve more, so the traction with the fingers increases and slip at the time of writing can be prevented. Due to the first space part 40 being a single cylindrical space, no matter what position in the circumferential direction of the writing instrument 1 the user holds, equal elastic deformation occurs and an equal holding feel can be obtained. Due to the outside shaft part 11 being formed by a nonviscoelastic plastic, change of the material of the outside shaft part 11 due to absorption of sweat of the user or aging is suppressed and the occurrence of stickiness is prevented. In short, according to the grip 7 of the writing instrument 1, despite aging, it is possible to stably prevent slip and maintain the holding feel.

The inside shaft part 21, that is, the rear shaft 20, may be formed by the same material as the front shaft 10 or may be formed by a different material. By the front shaft 10 and rear shaft 20 and further the inside barrel 30 being formed by the same material, recycling when disposing of the writing instrument 1 becomes easier. The grip 7, that is, the outside shaft part 11 and inside shaft part 21, need not be circular in cross-section and may also be polygonal, for example, hexagonal in cross-section like a pencil. In this case, the single space formed between the outside shaft part 11 and inside shaft part 21 becomes a cylindrical shape with a hexagonal cross-section.

By the outside shaft part 11 being formed by a nonviscoelastic plastic, compared with a conventional writing instrument having a metal grip, more inexpensive, simpler production becomes possible. Further, the grip 7 is formed by the outside shaft part 11 and inside shaft part 21, that is, by the front shaft 10 and rear shaft 20. Therefore, compared with a conventional writing instrument where an additional viscoelastic material is provided at the grip, the number of parts is smaller and the amount of material used is sparser, so more inexpensive, simpler production becomes possible.

At the front shaft 10, a female screw part may be provided at the inside surface of the rear end part of the front shaft 10 and a corresponding male screw part may be provided at the mating part 23 of the rear shaft 20. In this case, the outside surface of the front end part of the rear shaft 20 may be strongly mated with the inside surface of the front shaft 10 or may be gently mated with it. On the other hand, the inside surface of the rear end part of the front shaft 10 may be strongly mated with the outside surface of the rear shaft 20 or may be gently mated with it and the outside surface of the front end part of the rear shaft 20 may be strongly mated with the inside surface of the front shaft 10 or may be gently mated with it. In short, in the grip 7, if the part where the outside surface of the front end part of the inside shaft part 21 and the inside surface of the outside shaft part 11 are connected is designated as a "first connecting part" and the part where the inside surface of the rear end part of the outside shaft part 11 and the outside surface of the inside shaft part 21 are connected is designated as a "second connecting part", a first space part 40 is defined between the first connecting part and second connecting part.

The above-mentioned embodiment is configured so that the front shaft 10 has the outside shaft part 11, the rear shaft 20 has the inside shaft part 21, and the rear shaft 20 is inserted in the front shaft 10, but the front shaft 10 may also have the inside shaft part, the rear shaft 20 may have the outside shaft part, and the front shaft 10 may be inserted into the rear shaft 20. In this case, the grip 7 has the part where the outside surface of the rear end part of the inside shaft part and the inside surface of the outside shaft part are connected as the first connecting part, has the part where the inside surface of the front end part of the outside shaft part and the outside surface of the inside shaft part are connected as the second connecting part, and has a first space part defined between the first connecting part and second connecting part. The connection at one or both of the above-mentioned first connecting part and second connecting part is preferably a screw connection.

FIG. 6 is a vertical cross-sectional view showing clamping on to an object A by the clip member 8. Specifically, FIG. 6(A) shows the clip member 8 before clamping on to an object A while FIG. 6(B) shows the clip member 8 after clamping on to an object A. First, while referring to FIG. 1 and FIG. 6(A), the assembly operation of the shaft barrel 2, that is, the assembly operation of the rear shaft 20 and inside barrel 30, will be explained. The shaft barrel 2 is assembled by the inside barrel 30 being inserted to the inside of the rear shaft 20. Specifically, the inside barrel 30 is inserted to the inside of the rear shaft 20 so that the vertical projection 36 of the inside barrel 30 is inserted into the groove part 29b of the rear shaft 20. At this time, the inside clip part 32 of the inside barrel 30 is arranged inside the recessed part 27 of the outside clip part 26 through the insertion hole 25a of the rear shaft 20. The parts are assembled so that the mating projection 37 formed at the vertical projection 36 of the inside barrel 30 mates with the mating hole 29a of the rear shaft 20, and the inside barrel 30 will not easily pull out from the rear shaft 20.

As shown in FIG. 6(A), in the state where the inside clip part 32 is arranged inside the recessed part 27, the front end part 34b abuts against and is supported by the restricting surface 28 of the recessed part 27. The abutting part 35 of the inside clip part 32 approaches or abuts against the side surface of the rear shaft 20. Therefore, inside the recessed part 27, the inside clip part 32, in particular the second space part 41 substantially closed by the curved part 33, is provided.

If inserting an object A between the shaft barrel 2 and clip member 8 from the state shown in FIG. 6(A), so long as the thickness of the object A is smaller than the distance separating the side surface of the shaft barrel 2 and the outside clip part 26, the outside clip part 26 will not deform, only the inside clip part 32 will elastically deform, and the object A will be clamped on to. That is, if inserting the object A, first the front end part of the object A abuts against the abutting part 35. Next, if the object A is further inserted, the inside clip part 32 elastically deforms so that the abutting part 35 separates from the side surface of the shaft barrel 2 corresponding to the thickness of the object A. Specifically, the inside clip part 32 deforms so that the curved part 33 becomes flatter. That is, the deformation of the inside clip part 32 to the outside in the diametrical direction is restricted by the restricting surface 28 of the recessed part 27 of the outside clip part 26. Deformation of the inside clip part 32 becomes possible due to the presence of the second space part 41 as free clearance. Further, deformation of the inside clip part 32 in the circumferential direction is restricted by the side surface at the inside of the recessed part 27.

When the object A is held, only the inside clip part 32 elastically deforms and the outside clip part 26 does not deform, so at the time of use, there is little deformation of the clip member 8 as a whole. In short, deformation of the inside clip part 32 is difficult to visually confirm from the outside since the inside clip part 32 is arranged at the inside of the recessed part 27 of the outside clip part 26. Therefore, even in a state where the clip member 8 clamps on to the object A, the appearance and balance of the writing instrument 1 as a whole are good. Further, deformation of the inside clip part 32 is restricted by the outside clip part 26, so excessive deformation is prevented and the clamping function of the clip member 8 can be maintained over a long period of time and the durability of the clip member 8 as a whole can be improved.

The recessed part 27 of the outside clip part 26 may be any shape so long as the second space part 41 is formed with the inside clip part 32 when not clamping an object A. Further, the second space part 41 may be just a clearance and may be any shape so long as restricting deformation and excessive deformation of the inside clip part 32. In other words, so long as restricting deformation and excessive deformation of the inside clip part 32, the outside clip part 26 need not have the recessed part 27. Therefore, in the above-mentioned embodiment, the front end part 34b of the inside clip part 32 constantly abuts against the restricting surface 28 of the recessed part 27 of the outside clip part 26, but it may be made to be separated from the restricting surface 28 when not clamping on to an object A. In this case, in the state clamping on to the object A, the front end part 34b abuts against the restricting surface 28 whereby deformation of the inside clip part 32 is restricted. Furthermore, the inside clip part 32 may be formed so as to not have the curved part 33 but extend straight from the base part 34a toward the side surface of the shaft barrel 2. In this case, the front end part 34b of the inside clip part 32 is formed so as to approach or abut against the side surface of the shaft barrel 2. The inside clip part 32 has a projection shaped abutting part 35, but the abutting part 35 may be omitted and the curved part 33 used to directly clamp on to an object A.

The above-mentioned structures of the grip 7 and clip member 8 can be applied to the writing instrument as a whole independently or in combination. For example, the above-mentioned structures of the grip 7 and clip member 8 may be applied to not only click-type writing instruments, but also cap-type writing instruments. They may also be applied to not only ballpoint pens, but also mechanical pencils, felt tip pens, marker pens, fountain pens, thermochromic writing instruments, and other writing instruments.

The refill 3 of the writing instrument 1 is a water-based ballpoint pen cartridge comprised of an ink-storing tube inside of which a water-based ballpoint pen ink composition comprised of water, a coloring agent, and organic resin particles is housed, in which water-based ballpoint pen cartridge, the organic resin particles are olefinic resin particles and, when the amount of ink consumption per 100 m of the aqueous ball pen is A (mg) and the ball diameter is B (mm), the relationship of $150 \leq A/B \leq 450$ stands.

In the present embodiment, dark lines are obtained by increasing the amount of ink used, but if the amount of ink used increases, due to the clearance between the ball and the inside wall of the tip end, the writing performance ends up being affected with leakage of ink, blurring of lines, and dropoff of ink, so when the amount of ink used per 100 m is "A (mg)" and the ball diameter is "B (mm)", by making the relationship $150 \leq A/B \leq 450$, the lines become dark and the writing feel is improved while good writing performance with no blurring or dropoff of ink can be obtained. Note that, regarding the amount of ink used, a writing device based on JIS S6061 is used for a spiral writing test under conditions of a writing angle of 65° and a writing load of 100 g at a speed of a writing speed of 4.5 m/min using five test samples. The average value of the amount of ink used per 100 m is defined as the amount of ink used per 100 m. Further, regarding the ball diameter, a 0.5 to 1.0 (mm) or so ball is used.

Further, by using olefinic resin particles for the organic resin particles of the ink, ink leakage can be remarkably reduced while the writing feel can be enhanced. By the olefinic resin particles being contained as the water-based ballpoint pen ink composition, it is possible to create a physical barrier between the ball and the inside wall of the tip front end to suppress ink leakage. Furthermore, olefinic resin particles are lower in hardness compared with inorganics, so some of the particles partially deform and closely contact each other whereby weak aggregated structures are formed and ink leakage is suppressed. Furthermore, olefinic resin particles are hydrocarbon compounds and nonpolar, so easily aggregate in water. Aggregated structures optimized to suppress ink leakage while not causing ink shortages or other problems are easily formed, so it is presumed that the effect of suppression of ink leakage is obtained while the amount of ink used is kept the same. Furthermore, olefinic resin particles by nature are high in melting temperature, so easily stably remain present even in high temperature environments and, in the case of a high pressure environment, easily deform and are resistant to modification, so remain stable even if sandwiched between the ball and ball seat, therefore a cushioning effect is obtained, the writing feel is improved, and an effect of suppression of wear of the ball seat is obtained, so these are preferably used. As the material of the olefinic resin particles, polyethylene, polypropylene, polybutene, and other polyolefins and their mixtures may be mentioned. Among these as well, if considering the suppression of ink leakage and the improvement of the writing feel, polyethylene is preferably used. Specifically, low density polyethylene, high density polyethylene, low molecular weight polyethylene, modified polyethylene, modified high density polyethylene, etc. may be mentioned. Among these as well, if considering the effect of suppression of ink leakage, low density polyethylene, low molecular weight polyethylene, and modified polyethylene are preferable. In particular, low density polyethylene is lower in melting point than other types of polyethylene and is soft by nature, so the polyethylene particles easily closely contact, clearances between particles are hard to form, and ink becomes hard to leak, so low density polyethylene is preferable. Further, low density polyethylene is soft, so the cushioning effect of the ball and ball seat is easily obtained, the writing feel is improved, and wear of the ball seat can be suppressed, so this is preferably used. The average particle size of the olefinic resin particles is preferably less than 10 μm because with a smaller average particle size, the particles easily contact, weak aggregated structures are formed, and ink leakage is easily suppressed. Further, by forming aggregated structures by hydrogen bonds, even if the particles themselves are relatively small, macro aggregated structures easily form, so even if using finer particle sizes, an excellent effect of suppression of ink leakage can be obtained. On the other hand, if the average particle size is too small, the effect of suppression of ink leakage easily deteriorates, so the average particle size is preferably 0.1 μm or more. Further, the average particle size can be determined by using a laser diffraction particle size distribution analyzer (product name "MicrotracHRA9320-X100", Nikkiso) to measure the particle size distribution by the laser diffraction method and measuring the particle size (D50) at the time of 50% total volume. The olefinic resin particles are preferably spherical resin particles in shape. The "spherical resin particles" referred to here are not limited to true spheres. They may also be approximately spherical resin particles, approximately oval spherical resin particles, etc. Further, the olefinic resin particles are preferably made olefin dispersions dispersed in advance in water etc. The pH value of the olefin dispersion is preferably 7 to 10. This is so as to make it easier to improve the stability of dispersion of the olefin resin particles and the stability with respect to the coloring agents, surfactants, and other ink components. Regarding the olefinic resin particles, specifically Chemipearl M-200 (low density polyethylene dispersion, average particle size 6 μm, pH value 9), same W-100 (low mole weight polyethylene dispersion, average particle size 3 μm, pH value 9), same W-200 (low molecular weight polyethylene dispersion, average particle size 6 μm, pH value 9), same W300 (low molecular weight polyethylene dispersion, average particle size 3 μm, pH value 9), same W-310 (low molecular weight polyethylene dispersion, average particle size 9.5 μm, pH value 8), same W-400 (low molecular weight polyethylene dispersion, average particle size 4 μm, pH value 9), same W-800 (low molecular weight polyethylene dispersion, average particle size 8 μm, pH value 9), same W900 (low molecular weight polyethylene dispersion, average particle size 0.6 μm, pH value 11), same S300 (average particle size 0.5 μm, carboxylic acid modified polyolefin dispersion, pH value 10), same SA100 (average particle size 1 μm, carboxylic acid modified polyolefin dispersion, pH value 10) (above made by Mitsui Chemicals), Nopcall MS-40 (average particle size 1.0 μm, polyethylene paraffin wax), Nopcall PEM-17 (average particle size 0.01 μm, polyethylene wax) (above made by San Nopco), CERAFLOUR950 (modified polyethylene resin, average particle size 9 μm), same 925 (modified polyethylene resin, average particle size 6 μm), same 929 (modified polyethylene resin, average particle size 8 μm) (made by BYK), etc. may be mentioned. Further, the content of the olefinic resin particles is more preferably 0.01 to 10.0 mass % with respect to the total amount of the ink composition. This is because if the content of the olefinic resin particles is less than 0.01 mass %, it is difficult to suppress ink leakage while if exceeding 10.0 mass %, aggregated structures easily become stronger and the writing feel and dryup performance are easily affected.

Further, the distance (clearance) of possible movement in the axial direction of the ball of the ballpoint pen tip used for the present embodiment is preferably 10 to 50 μm. This is because if less than 10 μm, dark lines or a good writing feel becomes harder to obtain while if more than 50 μm, the performance in suppressing ink leakage is easily affected.

Regarding the ink viscosity, the ink viscosity is preferably 500 to 5000 mPa·s in a 20° C. environment and a shear rate of 1.92/s. This is because if the ink viscosity is less than 500 mPa·s, the ink viscosity becomes too low and ink leakage becomes harder to suppress. If more than 5000 mPa·s, the writing feel and suppression of wear of the ball seat easily deteriorate, the amount of ink used becomes smaller, and dark lines become harder to obtain.

Further, it is preferable to use a shear thinning agent as an ink viscosity adjuster. As the shear thinning agent, a crosslinking type acrylic acid polymer may be mentioned, as the polysaccharide, xanthan gum, welan gum, succinoglycan, guar gum, locust bean gum, λ-carrageenan, cellulose derivative, diutan gum, etc. may be mentioned, and as an associative thickener of a polyester type, polyether type, urethane-modified polyester type, polyaminoplast type, etc. depending on the associative hydrophobic groups, an alkali swelling associative thickener, nonionic associative thickener, etc. may be mentioned. These shear thinning agents may be used alone or in combinations of two or more types.

Among the shear thinning agents, if considering the effect of suppression of ink leakage, a polysaccharide or associative thickener is preferably used. Further, among the polysaccharides, xanthan gum and succinoglycan are preferably used. This is because by joint use with olefinic resin particles, it becomes easier to form 3D structures and easier to obtain the effect of suppressing ink leakage. Further, for the associative thickener, an alkaline swelling associative thickener is preferable. This is because, among the associative thickeners as well, the efficiency of obtaining the ink viscosity is high and further the adsorption with respect to olefinic resin particles is high, crosslinking structures become more easily formed, and high viscosity 3D structures are formed, so it is easier to suppress ink leakage and improve dye dispersion to thereby improve the ink stability along with time.

Further, as the alkaline swelling associative thickener, polymerizable resins of monomers or copolymers including various polymerizable monomers having acrylic acid, methacrylic acid, maleic acid, or other carboxyl groups as mechanisms exhibiting alkaline swellability may be mentioned. These are preferable since having swellability with long term stability, the effect can be expected of easier suppression of ink leakage, improvement of pigment dispersion, and improvement of ink stability over time. In particular, a thickener comprised of the three types of monomers of vinyl acetate, methyl methacrylate, and methacrylic acid is preferable.

Further, the content of the shear thinning agent is more preferably 0.01 to 5.0 mass % with respect to the total amount of the ink used. This is because if the content of the shear thinning agent is less than 0.01 mass %, the ink thickening effect is not sufficient and ink leakage becomes harder to suppress, while if more than 5.0 mass %, the ink viscosity easily becomes higher, wear of the ball seat is suppressed, and the trackability, writing feel, and dryup performance at the time of writing are easily affected.

Regarding the coloring agent used in the present embodiment, as pigments, inorganic pigments, organic pigments, processed pigments, etc. may be mentioned, but specifically carbon black, aniline black, Prussian blue, yellow lead, titanium oxide, iron oxide, phthalocyanine pigments, azo pigments, quinacridone pigments, quinophthalone pigments, styrene pigments, triphenylmethane pigments, perinone pigments, perilene pigments, dioxazine pigments, microcapsules, aluminum pigments, pearl pigments, fluorescent pigments, luminous pigments, complementary color pigments, etc. may be mentioned. As dyes, direct dyes, acid dyes, basic dyes, metal dyes, various salt-type dyes, etc. can be employed. These pigments and dyes may be used alone or in combinations of two or more types. The coloring agent preferably contains carbon black with an amount of oil absorption of 100 g or more. This is because the amount of oil absorption is an alternative property expressing the structure of carbon black. The greater the amount of oil absorption, the larger the structure. Carbon black with an amount of oil absorption of 100 g or more has a large structure, so permeation into the paper surface is suppressed. The carbon black itself remains on the paper surface, whereby dark, clear lines are obtained. Furthermore, the amount of oil absorption of carbon black is preferably 100 to 200 g (/100 g), This is because if more than 200 g (/100 g), the carbon black tends to easily precipitate. The amount of oil absorption of carbon black is a property showing the structure of carbon black. It means the amount of DBP (dibutyl phthalate) a certain amount of dried carbon black absorbs and is measured by the test method prescribed in JIS K6221. Among these coloring agents, pigment particles with an average particle size of less than 1 μm are preferably used. This is because if using olefinic resin particles with an average particle size of less than 10 μm, if clearances are formed between olefinic resin particles when the olefinic resin particles closely contact each other, suppression of ink leakage is sometimes affected, but these clearances are filled in by the pigment particles with an average particle size of less than 1 μm, whereby the effect of suppression of ink leakage is more easily obtained. Furthermore, the pigment particles are preferably spherical pigment particles in shape. The "spherical pigment particles" referred to here are not limited to true spherical shapes and may also be approximately spherical pigment particles, approximately oval spherical pigment particles, etc. Further, the average particle size of the pigment particles can be determined by using a laser diffraction particle size distribution analyzer (product name "MicrotracHRA9320-X100", Nikkiso) to measure the particle size distribution by the laser diffraction method and measuring the particle size (D50) at the time of 50% total volume.

Further, if the average particle size of the olefinic resin particles is "X μm" and the average particle size of the pigment particles is "Y μm", the relationship is preferably Y/X≤1.0. This is because if clearances are formed between olefinic resin particles when the olefinic resin particles closely contact each other, the clearances are hard to fill in and suppression of ink leakage is easily affected.

Further, to suppress ink leakage, it is preferable to use dextrin. This is because by using dextrin, when the ink at the pen tip dries, a film is formed whereby the effect is obtained of suppressing ink leakage from the clearance between the ball and the inside wall of the tip front end. Further, the weight average molecular weight of the dextrin is more preferably 20000 to 120000. If the weight average molecular weight is more than 120000, the film formed at the pen tip tends to become hard and dropoff of ink tends to easily occur at the lines when writing at the time of drying up. On the other hand, if the weight average molecular weight is less than 20000, the moisture absorption tends to easily become greater, the film to easily become soft at the pen tip, and the effect of suppression of ink leakage to become harder to sufficiently obtain. The content of dextrin is preferably 0.1 to 5.0 mass % with respect to the total amount of the ink composition. This is because if less than 0.1 mass %, the effect of suppression of ink leakage tends to not be sufficiently obtained, while if more than 5.0 mass %, the dextrin tends to become harder to dissolve in the ink.

Further, a water soluble solvent is used considering the stability in dissolution of moisture, prevention of evaporation and drying of moisture, etc. Ethyleneglycol, diethyleneglycol, triethyleneglycol, propyleneglycol, polyethyleneglycol, glycerin, or other polyhydric alcohol solvents, methanol, ethanol, 1-propanol, 2-propanol, isopropanol, isobutanol, t-butanol, allyl alcohol, 3-methyl-1-butin-3-ol, ethyleneglycol monomethylether acetate, or other higher alcohols or other alcohol-based solvents, ethyleneglycol monomethylether, ethyleneglycol monoethylether, 3-methoxybutanol, 3-methoxy-3-methylbutanol, and other glycolester-based solvents etc. may be mentioned. Among these as well, considering the stability of dissolution of the olefinic resin particles used in the present embodiment, a polyhydric alcohol solvent is preferably used. A "polyhydric alcohol solvent" is a solvent comprised of a compound with two or more hydroxy groups bonded with different phase carbon atoms of aliphatic or alicyclic compounds. Among these as well, inclusion of at least a polyhydric alcohol having bivalent or trivalent hydroxy groups is most preferable. These may be used alone or in combinations of two or more types. The content of the water-soluble solvent is preferably 0.1 to 25.0 mass % with respect to the total amount of ink composition considering solubility, ink leakage, blurring, etc. This is because due to the hydrogen bonds due to the solvent, the aggregated structures become easy to break apart and the effect of suppression of ink leakage due to the olefin resin particles is easily affected.

Further, by improvement of the lubrication ability, rotation of the ball is made smoother, whereby the suppression of wear of the ball seat and improvement of the writing feel are made easier to improve. For this reason, a phosphoric acid ester-based surfactant and fatty acid can be used. In particular, use of a phosphoric acid ester-based surfactant having a phosphoric acid group is preferable. This is because by the phosphoric acid groups adsorbing metal, the lubrication ability is improved and suppression of wear of the ball seat and improvement of the writing feel are made easier. As the type of the phosphoric acid ester-based surfactant, a styrenated phenol surfactant, nonylphenol surfactant, lauryl alcohol surfactant, tridecyl alcohol surfactant, octylphenol surfactant, hexanol surfactant, etc. may be mentioned. Among these as well, if having a phenol skeleton, the lubrication ability is easily affected due to steric hindrance, so it is preferable to use a phosphoric acid ester-based surfactant not having a phenyl skeleton. If considering better lubrication ability, a lauryl alcohol surfactant or a tridecyl alcohol-based phosphoric acid-based surfactant is preferable. These may be used alone or in combinations of two or more types.

Further, to make the lines darker by use of pigment particles, it is preferable to use one or more surfactants selected from a silicone-based surfactant, acetyleneglycol-based surfactant, fluorine-based surfactant, or dialkylsulfosuccinate. This is because by the permeability with respect to paper being improved, pigment particles remain on the paper surface and darker, clearer lines are easily obtained. For this reason, by using the surfactant by the relationship of 150≤A/B≤450 like in the present embodiment, darker, clearer lines are easily obtained. Among these as well, a fluorine-based surfactant is preferably used. This is because a fluorine-based surfactant enables the most reduction of the surface tension and permeation to the paper is also easily improved, so dark lines are easily obtained. Further, as the silicone-based surfactant, a polyether modified silicone oil, methylstyryl modified silicone oil, alkyl modified silicone oil, higher fatty acid ester modified silicone oil, hydrophilic specially modified silicone oil, fluorine modified silicone oil, dimethyl silicone oil, methylphenyl silicone oil, or other silicone oil etc. may be mentioned. As the fluorine-based surfactant, a perfluoro group-containing butylsulfonate, perfluoro group-containing carbonate, perfluoro group-containing phosphoric acid ester, perfluoro group-containing phosphoric acid ester type compound, perfluoroalkylethyleneoxide adduct, perfluoro group/hydrophilic group/lipophilic group-containing oligomer, perfluoro group/hydrophilic group-containing oligomer, perfluoro group/lyophilic group-containing oligomer, perfluoroalkylbetaine, perfluoroalkylaminoxide compound, etc. may be mentioned. Among these as well, a perfluoroalkylethyleneoxide adduct is preferably used. This is because a fluorine-based surfactant of a perfluoroalkylethyleneoxide adduct can make darker lines easier to form, therefore can be preferably used. Furthermore, the fact may be mentioned that if there are ethyleneoxide groups, the hydrophilicity becomes stronger, so dissolution in water becomes easier and the stability over time tends to become stabler. These may be used alone or in combinations of two or more types.

Other additives can be included as desired. Specifically, to improve the aging stability of the coloring agent and further the lubrication ability, a pH adjuster, acrylic resin emulsion, urethane resin emulsion, styrene-butadiene-based resin emulsion, or other fixing agent, acidic resin or other dye dispersant, 1,2-benzoisothiazolin-3-one or other antibacterial agent, urea, sorbitol or other humectant, benzotriazole or other rust preventer, ethylenediaminetetraacetic acid or other chelating agent, etc. can be added.

Further, the pH value of the aqueous ball pen ink composition is preferably 7.0 to 10.0. This is because if the pH value is less than 7 or in acidic region, the stability with respect to the olefin resin particles, coloring agent, surfactant, and other ink components will be affected and the corrosion resistance of the metal ball pen tip or ball will be affected, so even if the pH value is more than 10 and approaches the strong alkaline side, the stability with respect to the ink components will end up being similarly affected.

Further, to better improve the lubrication ability and obtain dark lines, the arithmetic mean roughness (Ra) of the ball surface is more preferably made 0.1 to 5 nm. This is because if the arithmetic mean roughness (Ra) exceeds this range, the ball surface will become too rough and the rotational resistance of the ball and ball seat will easily become larger, so the writing feel will tend to easily worsen. Further, if below this range, ink will not sufficiently be carried on the ball surface, so the tendency for dark lines to become harder to obtain will become stronger. Regarding the arithmetic mean roughness of the ball surface, the "arithmetic mean roughness (Ra)" is the value obtained by taking from a roughness curve measured by a surface roughness measuring device (Model Name SPI3800N made by Seiko-Epson) exactly a reference length in the direction of its mean line and totaling up and averaging the absolute values of the differences from the mean line of the taken part to the measurement curve. Further, the ball material is not particularly limited, but a cemented carbide ball mainly comprised of tungsten carbide or silicon carbide, alumina, zirconia, silicon nitride, stainless steel, etc. may be mentioned. In particular, a cemented carbide ball is low cost. Further, ink is easily carried on the ball surface. This is also advantageous at the time of writing on a writing surface which hand oil is deposited.

REFERENCE SIGNS LIST 1 writing instrument
2 shaft barrel
3 refill
4 spring
5 rotor
6 operating member
7 grip
8 clip member
10 front shaft
11 outside shaft part
12 female screw part
20 rear shaft
21 inside shaft part
22 male screw part
26 outside clip part
27 recessed part
28 restricting surface
30 inside barrel
31 second connecting part
32 inside clip part
33 curved part
34a base part
34b front end part
35 abutting part
38 outside cam
40 first space part
41 second space part

The invention claimed is:
1. A writing instrument comprising:
a shaft barrel; and
a grip provided at part of the shaft barrel, wherein
the grip has a cylindrically shaped inside shaft part and a cylindrically shaped outside shaft part arranged at an outside of the inside shaft part, thinner than the inside shaft part, and comprised of a nonviscoelastic plastic and a space part is provided between the inside shaft part and the outside shaft part,
the outside shaft part is elastically deformable in a diametrical direction, and
deformation inward in the diametrical direction of the outside shaft part is restricted by an inside surface of the outside shaft part abutting against an outside surface of the inside shaft part.

2. The writing instrument according to claim 1, wherein the space part is a single cylindrical space.

3. The writing instrument according to claim 1, wherein the grip further has a first connecting part at which an outside surface of an end of the inside shaft part and the inside surface of the outside shaft part are connected and a second connecting part at which an inside surface of an end of the outside shaft part and the outside surface of the inside shaft part are connected, the space part being defined between the first connecting part and the second connecting part.

4. The writing instrument according to claim 1, wherein the inside shaft part and the outside shaft part are formed by the same materials.

5. The writing instrument according to claim 1, wherein the shaft barrel has a front shaft and a rear shaft, the front shaft has the outside shaft part, and the rear shaft has the inside shaft part.

6. The writing instrument according to claim 1, further comprising a clip member, the clip member having an outside clip part extending along an axial direction of the shaft barrel and separated from a side surface of the shaft barrel and an inside clip part extending along the axial direction between the shaft barrel and the outside clip part, and configured so that just the inside clip part elastically deforms and can clamp on to an object without the outside clip part deforming and so that the elastic deformation of the inside clip part is restricted by an inside surface of the outside clip part.

7. The writing instrument according to claim 6, wherein the inside clip part has a curved part curving toward a center axial direction of the shaft barrel, and an object can be clamped on to by the curved part.

8. The writing instrument according to claim 7, wherein the inside clip part has a projection shaped abutting part, and the abutting part approaches or abuts against the side surface of the shaft barrel.

9. The writing instrument according to claim 8, wherein the outside clip part is provided with a recessed part, and the inside clip part is arranged inside the recessed part.

10. The writing instrument according to claim 9, wherein the shaft barrel has an inside barrel mating with a rear end part of the shaft barrel, the outside clip part is provided at the rear end part of the shaft barrel, the inside clip part is provided at the inside barrel, the writing instrument is a click-type writing instrument, and the inside barrel configures a click mechanism.

* * * * *